(12) United States Patent  
Nave

(10) Patent No.: US 7,668,313 B2
(45) Date of Patent: Feb. 23, 2010

(54) RECIPIENT-ENCRYPTED SESSION KEY CRYPTOGRAPHY

(75) Inventor: James Edward Nave, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 805 days.

(21) Appl. No.: 11/263,455

(22) Filed: Oct. 31, 2005

(65) Prior Publication Data

US 2007/0098179 A1 May 3, 2007

(51) Int. Cl.
*H04L 9/00* (2006.01)
(52) U.S. Cl. .................................... 380/259; 380/281
(58) Field of Classification Search ................. 380/259, 380/278, 281, 286, 28, 29, 45, 282, 285; 713/170, 171
See application file for complete search history.

(56) References Cited

U.S. PATENT DOCUMENTS

| | | | | |
|---|---|---|---|---|
| 6,259,789 B1 * | 7/2001 | Paone | ........................... | 380/28 |
| 6,275,588 B1 * | 8/2001 | Videcrantz et al. | .......... | 380/255 |
| 6,505,301 B1 * | 1/2003 | Matyas et al. | ............... | 713/169 |
| 7,353,388 B1 * | 4/2008 | Gilman et al. | .............. | 713/168 |
| 7,383,440 B1 * | 6/2008 | Miller et al. | ................ | 713/171 |
| 7,565,537 B2 * | 7/2009 | Morais et al. | ............... | 713/169 |
| 2005/0267845 A1 * | 12/2005 | Oh et al. | ....................... | 705/51 |

* cited by examiner

*Primary Examiner*—Beemnet W Dada
(74) *Attorney, Agent, or Firm*—John J. Patti; Wade J. Brady III; Frederick J. Telecky, Jr.

(57) ABSTRACT

A method for protecting secret keys, such as HDCP device key sets, during the manufacturing process is disclosed. In particular, the present invention comprises a method for securely sending and receiving data, such as HDCP device key sets, for use in a cryptosystem. In operation, a first party, referred to as a sender (107) is to send original data (106) to a second party, referred to as a recipient (100). To facilitate the secure transmission, the recipient (100) randomly generates (101) a session key (102) and encrypts it with its private key-encryption key (103). The recipient then securely sends both the encrypted and unencrypted session keys to the sender. The sender (107) then encrypts the original data (106) using the unencrypted session key (102) and includes the encrypted data (108) along with the encrypted session key (104) to the recipient (100). The recipient (100) then decrypts the encrypted session key (104) using the private key-encryption key (103) and then decrypts the original data (106).

20 Claims, 2 Drawing Sheets

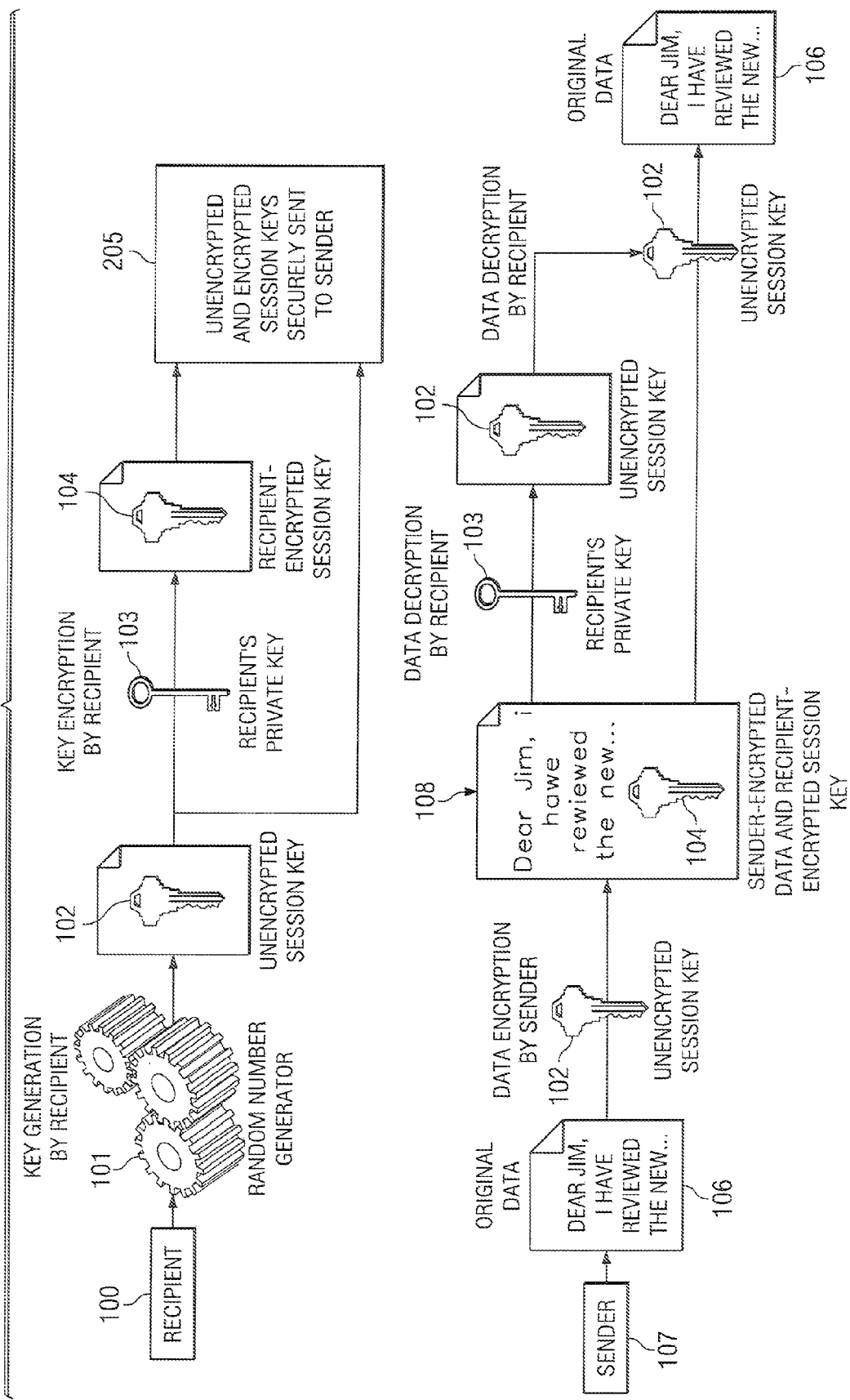

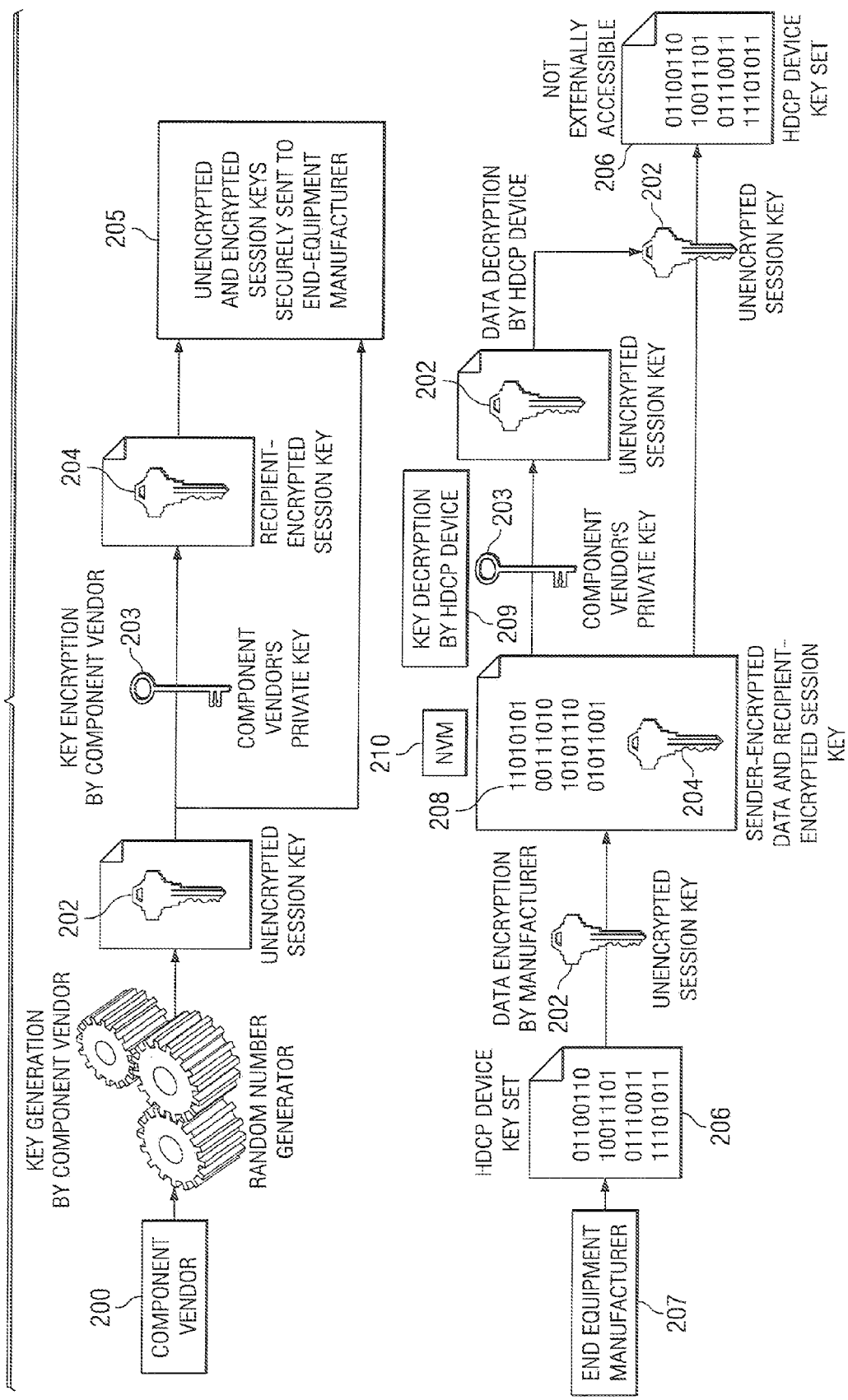

RECIPIENT-ENCRYPTED SESSION KEY CRYPTOGRAPHY

FIELD OF THE INVENTION

This invention relates generally to cryptography and cryptosystems and specifically to a method for protecting secret keys, such as HDCP device key sets, during the manufacturing process.

BACKGROUND OF THE INVENTION

Because of copyright infringement and piracy concerns, there is desired secure methods and devices for the transmission and reception of legally protectable content or data over a communication channel. More specifically, and as an example, due to the copyright concerns of content owners, there is a need for secure transmission of digital content from digital media to a corresponding display, such as a digital versatile disk ("DVD") player on a computer to the computer display. In order to secure the Audiovisual content, the transmission between the transmitter of the DVD player and the receiver of the display can be encrypted and decrypted using an appropriate cryptographic algorithm. Cryptographic algorithms typically require one or more secret encryption/decryption keys to operate. It is the secure storage of these secret device keys that is the focus of this invention. The following abbreviations for certain cryptography related terms are used herein:

| AES | Advanced Encryption Standard |
| --- | --- |
| AKE | Authentication & Key Exchange |
| CCI | Copy Control Information |
| CEK | Content-Encryption Key |
| DCP | Digital Content Protection, LLC |
| DDC | Display Data Channel |
| DES | Data Encryption Standard |
| DH | Diffie-Hellman |
| DTCP | Digital Transmission Content Protection |
| DTLA | Digital Transmission Licensing Authority |
| DVI | Digital Visual Interface |
| HDCP | High-bandwidth Digital Content Protection System |
| HDMI | High-Definition Multimedia Interface |
| I2C | Inter-Integrated Circuit Bus |
| KEK | Key-Encryption Key |
| KSV | Key Selection Vector |
| NVM | Non-Volatile Memory |
| PGP | Pretty Good Privacy |
| PRNG | Pseudo Random Number Generator |
| RSA | Rivest, Shamir, Adleman |

As used herein, NVM is used to refer to any type of read only memory ("ROM"), rigid disk drive, or optical disk drive. For example ROM includes programmable ROM ("PROM"), electrically erasable programmable ROM ("EEPROM"), ultra-violet ("UV") erasable programmable ROM, flash memory, video BIOS ("VBIOS"), ROM BIOS, or EDID ROM. Further, rigid disk drive ("RDD") includes floppy disk drive ("FDD"), hard disk drive ("HDD"), zip drive, or LS-120 Drive or Super Drive. Optical disk drive includes CD drive ("CD-ROM", "CD-RW", "CDC-R"), DVD drive ("DVD-ROM", "DVD-RW", "DVD-RAM", "DVD-R", "DVD-WO") or magneto-optical ("MO") drive.

In the case of the transmission and reception of copy-protected Audiovisual content, the "High-bandwidth Digital Content Protection System" V1.0 and V1.1 specification requires that each HDCP-enabled transmitter and receiver device be assigned and use a unique set of secret device keys for the HDCP cipher process. Under the HDCP specification, each device key set consists of a non-secret 40-bit KSV and forty 56-bit secret keys, requiring a total of 2280 bits or 285 bytes for storage. For an HDCP transmitter with an upstream protocol described by the "Upstream Link for the High-bandwidth Digital Content Protection System" V0.90 ("ULHD-CPS") from Intel, two device key sets are required. The HDCP specification and the ULHDCPS protocol are both incorporated herein by reference. Each of these protocols has a process for authentication and a process for exchange of keys. Authentication is a cryptographic process for verifying that a device is authorized or licensed to handle protected content. Key exchange is a cryptographic process for establishing a shared secret key between devices. CCI specifies the conditions under which a copy of copyrighted content can be made.

The following is a general description of the overall key protection procedure conventionally used in an HDCP compliant system. These activities are performed by (1) a key licensing authority, such as DCP, (2) an end-equipment manufacturer, such as a DVD player manufacturer or display manufacturer, and (3) a component vendor such as a maker of chips. The key licensing authority, such as DCP, performs certain activities. First, DCP generates multiple HDCP device key sets for a party or entity, typically the end-equipment manufacturer. In certain circumstances the party or entity receiving the keys from DCP may be a component vendor if the component vendor is embedding the keys in the devices. For purposes of this description, it is assumed that the HDCP device key order is prepared for the end-equipment manufacturer. Then, the entire HDCP device key order is encrypted using the public key of the end-equipment manufacturer prior to being written to a media, such as a CD-R. Lastly, the media, such as the CD-R, storing the encrypted HDCP device key order is sent to the end-equipment manufacturer via common carrier.

The following activities are performed by the component vendor. One or more global key-encryption keys (Kg) are randomly generated and programmed into the silicon devices. A unique content-encryption key (Ku) is randomly generated for each HDCP compliant device This Ku is programmed into each HDCP device by the component vendor during the wafer manufacturing flow. In addition, a shared content-encryption key (Ks) is randomly generated for each end-equipment manufacturer. Each content-encryption key (Ks) is encrypted using Kg. Then one pair of unencrypted and encrypted Ks values is securely sent to each end-equipment manufacturer, for example using a software package compatible with the Open PGP standard.

The following activities are performed by the end-equipment manufacturer. First, each HDCP device key set is encrypted using the shared content-encryption Ks. Next, the encrypted HDCP device key set is programmed into each NVM. Then, the encrypted version of Ks is programmed into the header of each NVM.

The following activities are performed automatically by the HDCP device. The content-encryption key (Ks) embedded in the NVM header is decrypted using Kg. Next, the unencrypted Ks value is used to decrypt the HDCP device key set stored in the NVM. Lastly, the HDCP device key set is re-encrypted using the unique content-encryption key (Ku).

Conventional methods for protecting these internally or externally stored device key sets require large amounts of on-chip NVM resulting in high device cost. Large amounts of on-chip NVM is required to store numerous spare content-encryption keys for renewability purposes. The entities embedding device keys, such as the end-equipment manufacturers or component vendors may desire to renew their device keys for a variety of reasons. The entity may renew the device keys as a matter of course, periodically, for example every six months, or after manufacturing a certain number of products, for example, after every million units, or whenever a new device key set package is received from the key licensing authority. The entities embedding device keys should, as a matter of course, renew the Ks whenever the Ks has been compromised. Device keys are compromised in a variety of methods, such as cryptanalysis, unauthorized disclosure, or accidental disclosure.

A variety of schemes and processes have been developed to address the current shortcomings in device key protection. These include public-key cryptography; Diffie-Hellman key exchange; on-chip key generation logic for content-encryption keys; multiple on-chip content-encryption keys; single on-chip content-encryption key; and key handling software tools.

The advantage of public-key cryptography, e.g., sender-encrypted session key such as RSA, over symmetric-key cryptography, such as DES, is that the private decryption key does not need to be disclosed, for example, to the end-equipment manufacturer. Also, only one on-chip private key is required for implementation, the process supports renewability, key distribution is relatively easy, the session key is used only one time, and the sender can create new session keys independent from recipient. The disadvantage with public-key cryptography is that the algorithm is much more complex, hence implementation requires the highest circuit complexity, more die area resulting in higher device cost, and processing is slow. In addition, this method does not leverage the existing DES cipher engine. Furthermore, public-key cryptosystems are vulnerable to chosen-plaintext attacks.

The advantage with Diffie-Hellman key exchange compared to symmetric-key cryptography, such as DES, is that the private decryption key does not need to be disclosed, for example to the end-equipment manufacturers. In addition, only one on-chip private key is required for implementation, the method supports renewability, key distribution is relatively easy, each session key is used only one time, and the sender can create new session keys independent from the recipient. The disadvantage with Diffie-Hellman key exchange is that the algorithm is much more complex, hence implementation requires the highest circuit complexity, more die area resulting in higher device cost, and processing is slow. In addition, this method does not leverage the existing DES cipher engine. Furthermore, Diffie-Hellman key exchange is vulnerable to man-in-the-middle attack. As can be seen, more traditional approaches for key exchange such as public-key or Diffie-Hellman are mathematically quite complex and disadvantageously are cost prohibitive.

On-chip key generation logic for content-encryption keys attempts to eliminate the cost associated with the on-chip NVM by generating rather than storing the array of content-encryption keys. The on-chip key generation logic for content-encryption keys supports renewability, utilizes exiting DES cipher engine and a smaller internal NVM is required for implementation. As the number of content-encryption keys supported on-chip increases, there will be a crossover point when generating the keys on-chip will require less die area than using a ROM-based lookup table approach. A disadvantage with this approach is that an on-chip NVM is still required to store an array of randomly generated seed values for the PRNG. When using a DES cipher engine to implement the PRNG, these randomly generated seed values include both 56-bit DES keys and 64-bit initialization vectors. Also, the number of seed values required for the life of the product must be predetermined. Thus, using an on-chip key generator may provide a slight reduction in the size of the on-chip NVM, but it does not eliminate the need for the internal NVM. The added circuit complexity of this method outweighs any benefit that might be achieved. Furthermore, the on-chip key generation logic for content-encryption keys method has high circuit complexity, difficult key distribution, session keys are used many times and the sender is dependent on the recipient for issuing new session keys.

The multiple on-chip content-encryption keys method attempts to address the renewability issue by storing multiple content-encryption keys in the on-chip NVM. The multiple on-chip content-encryption keys method advantageously supports renewability and utilizes the existing DES cipher engine. A significant disadvantage associated with this approach is that the number of secret 56-bit content-encryption keys required for the life of the product needs to be predetermined and stored in on-chip NVM. Overestimating the required number of keys wastes die area, which increases the overall device cost. On the other hand, underestimating the required number of keys shortens the life of the product. Other disadvantages of using the multiple on-chip content-encryption keys method includes: high device cost, large internal NVM required, difficult key distribution, the session key is used many times, and the sender is dependent on the recipient for issuing new session keys.

In the single on-chip content-encryption key method, the same DES key is programmed into each content protection device. The single on-chip content-encryption key method is simple thus resulting in low device cost. Also, this method utilizes exiting DES cipher engines. Disadvantageously, the algorithm used by the component vendors to protect the device key sets during the manufacturing process is shared with the end-equipment manufacturers. Component vendors should be extremely reluctant to disclose their one secret DES key to the end-equipment manufacturers as a massive recall of products would be required if the security for this one key was ever comprised. Other disadvantages of the single on-chip content-encryption key method includes no support for renewability, and difficult key distribution.

In addition to the methods described above, hybrid cryptosystems have been developed. These include public-key and symmetric-key hybrid cryptosystems wherein message data is encrypted using symmetric-key cryptography and session key, then a random number is used as the session key; the session key is encrypted using public-key cryptography and the recipient's public key, and the encrypted session key is sent along with encrypted message data.

Another hybrid cryptosystem is the Diffie-Hellman and symmetric-key hybrid cryptosystem wherein message data is encrypted using symmetric-key cryptography and the session key, then a DH secret value is generated using the sender's private value and the recipient's public value. The DH secret value is used as session key and the sender's DH public value is sent along with the encrypted message data. Each of these hybrid systems has advantages and disadvantages similar to those of their component methods.

Disadvantageously, private device key sets issued by key licensing authorities, such as the HDCP device keys issued by DCP for DVI and HDMI applications, are left unprotected throughout most of the manufacturing process. Furthermore, there is well known in the industry a number of techniques and processes for accessing otherwise protected data. These include, but are not limited to ciphertext-only attacks, known-plaintext attacks, chosen-plaintext attacks, adaptive-chosen-plaintext attacks, chosen-key attacks and rubber-hose cryptanalysis.

What is desired is a method for protecting private device key sets, including those issued by key licensing authorities, such HDCP device key sets issued by DCP for DVI and HDMI applications, during the manufacturing process, and otherwise.

SUMMARY OF THE INVENTION

The present invention comprises an improved method and device for protecting secret keys, such as HDCP device key sets, during the manufacturing process, and otherwise. There are several advantages of the method for protecting secret keys of the present invention. For example, disclosure of the private key-encryption key is not required, only one on-chip private key is required, the method supports renewability, there is a low device cost, and the method utilizes exiting DES cipher engines.

The method for protecting secret keys of the present invention can be used for both internally or externally stored device key sets. For externally stored device key sets, end-equipment manufacturers require a key protection scheme to protect the device key sets, such as HDCP key sets, during the manufacturing process. For internally stored device key sets, component vendors require a key protection scheme to protect the device key sets, such as HDCP key sets, during the manufacturing process. An exemplary embodiment of the present invention is described with reference to protecting HDCP device key sets issued by the key licensing authority DCP. However, this invention can also be used to protect other secret keys, for example, DTCP secret keys and elliptic curve parameters generated by the Digital Transmission Licensing Authority, LLC (DTLA) for 1394 applications. The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

DESCRIPTION OF THE DRAWINGS

The features of the present invention will be more clearly understood from consideration of the following descriptions in connection with accompanying drawings in which:

FIG. 1 is a flow chart of a generic example of the method of recipient encrypted session key cryptography of the present invention; and FIG. 2 is a flow chart of a HDCP specific example of the method of recipient encrypted session key cryptography of the present invention.

DETAILED DESCRIPTION OF THE EXEMPLARY EMBODIMENTS

As used herein, a recipient refers to the entity that receives a message or data generated by the sender and the sender refers to the entity that generates and then sends the message or data to the recipient. Generally, as described herein, a sender desiring to send a message or data to a recipient, requests a session key from a recipient in which to encrypt the message or data. The recipient generates the session key, encrypts it using its private key, and then sends the encrypted and unencrypted session key to the sender. The sender uses the unencrypted session key to encrypt the message or data, and then sends the encrypted session key and encrypted message or data back to the recipient. The recipient then decrypts the session key using its private key, and then, using the decrypted session key, decrypts the message or data.

An embodiment of the present invention is seen in FIG. 1. As seen therein, a first party, referred to as a sender 107 desires to send original data 106 to a second party, referred to as a recipient 100. To facilitate the secure transmission, recipient 100 randomly generates 101 a session key 102 and encrypts it with its private key-encryption key 103. The recipient 100 then securely sends 105 both the unencrypted session key 102 and encrypted session key 104 to the sender 107. The sender 107 then encrypts the original data 106 using the unencrypted session key 102 and includes the encrypted data 108 with the encrypted session key 104 to the recipient 100, for example, in a message header, which indicates to the recipient 100 which session key was used to encrypt the message 106. The recipient 100 then decrypts the encrypted session key 104 using its private key-encryption key 103 and then decrypts the original data 106 using the unencrypted session key 102. For example, if Alice were the sender, or the first party, and Bob the recipient, or the second party, then:

1. Alice calls Bob and requests a session key to communicate with him.
2. Bob generates a random session key and encrypts it with his private key.
3. Bob securely sends both the unencrypted and encrypted versions of the session key to Alice.
4. Alice encrypts her message with the session key.
5. Alice sends both the encrypted message and the encrypted session key to Bob.
6. Bob decrypts the session key using his private key.
7. Bob decrypts Alice's message using the session key.

Since the encrypted session key is included in each message received, Bob does not need to keep a record of what session key was given to Alice.

Based on the methodology of the present invention, session keys may be more accurately described as multi-session keys. This method for protecting secret keys can be implemented using HDCP compliant devices. Referring to FIG. 2, wherein an end-equipment manufacturer is the sender, or the first party, and the semiconductor device or component vendor, is the recipient or the second party:

1. The end-equipment manufacturer 207 contacts the semiconductor device or component vendor 200 and requests a session key Ks 202 to allow communication by the HDCP device 209 manufactured by the component vendor 200.
2. The semiconductor device or component vendor 200 generates 201 a random Ks 202 and encrypts it with its private key-encryption key Kg 203.
3. The semiconductor device or component vendor 200 securely sends both the unencrypted session key Ks 202 and encrypted session key Ks 204 to the end-equipment manufacturer 207.
4. The end-equipment manufacturer 207 uses the unencrypted session key Ks 202 to encrypt data 206 that comprises the portions of the HDCP device key set to be encrypted.
5. The end-equipment manufacturer 207 programs the encrypted data 208, here the HDCP device key set, and the encrypted session key Ks 204, into NVM 210.
6. The HDCP device 209 is adapted to decrypt the encrypted session key Ks 204 using a private key-encryption key Kg 203, which is a global key-encryption key Kg.
7. The HDCP device 209 then decrypts the encrypted portions of the data 208, here comprising the HDCP device key set, using the unencrypted session key Ks 202.

Since the encrypted session key Ks 204 is included in the header of each NVM 210, the HDCP device 209 does not need to store a record of all session keys that are issued to each end-equipment manufacturer 207.

Subsequent to protecting the HDCP device key set during the manufacturing process using the key protection scheme of this invention, the HDCP device can re-encrypt the HDCP device key set using a unique content-encryption key Ku to provide an increased level of key security throughout the life of the HDCP device. This recommended last step in the overall key protection scheme shall be referred to as "self-encryption for key storage".

The present invention has a number of advantages over conventional solutions. Advantageously, it simplifies the logistics associated with protecting internally or externally stored device key sets, such as HDCP key sets, during the manufacturing process. Furthermore, it reduces the likelihood that component vendors would ever need to spin an HDCP device due to its secret on-chip content-encryption keys being compromised. The use of the method for protecting secret keys of the present invention results in lower device cost compared to more traditional approaches such as public-key or Diffie-Hellman based key exchange. Further, the method for protecting secret keys eliminates the need to either store or generate a large number of content-encryption keys on-chip for key renewability purposes. In addition, the method for protecting secret keys of the present invention does not result in inherent lapses in key protection as when using a key handling software approach. It also reduces the vulnerability of the "self-encryption for key storage" algorithm to a chosen-plaintext attack.

In the present invention, renewability of session keys Ks is mandatory. Renewability is handled by simply sending the end-equipment manufacturer another pair of unencrypted and encrypted session keys upon request. All session keys preferably are securely transferred between the component vendor and the end-equipment manufacturer using, for example, a software package compatible with the OpenPGP standard.

In the method for protecting secret keys of the present invention, renewability of Kg is optional. Renewability can be handled by storing a few spare keys in on-chip ROM. The desired Kg key can be specified by embedding a Key Identification (Key ID) value in a multi-line NVM header. The desired key could also be selected by laser fuse, metal mask change, or by selecting spare pins on the device. Since the Kg keys are never actually distributed to customers, the need for renewability is greatly reduced. Since the session key Ks values are randomly generated numbers rather than normal text, the Kg keys are not susceptible to a ciphertext-only attack using the encrypted session key Ks values. Even if the customer inadvertently discloses their unencrypted secret Ks value, this would only create one pair of plaintext and ciphertext for cryptanalysis purposes per incident. The likelihood that any Kg keys would ever be compromised can be even further reduced by using Triple-DES to encrypt the Ks values. Hence, having anywhere from two to four selectable Kg keys on-chip should be plenty for the anticipate lifetime of the devices.

In the method for protecting secret keys of the present invention, renewability of Ku is not required. Although the "self encryption for key storage" algorithm is vulnerable to a chosen-plaintext attack, renewability is not required because it would take thousands of years to complete a chosen-plaintext attack using the slow $I^2C$ interface to the external NVM. Further, every HDCP device has a unique Ku key. Preferably, the end-equipment manufacturer would first send a request for a new Ks to the HDCP component vendor and then the component vendor would send back both unencrypted and encrypted versions of a randomly generated session key Ks. Alternatively, the end-equipment manufacturer can first randomly generate their own Ks and then send session keys Ks to the HDCP component vendor. The component vendor would then encrypt the session keys Ks using their private key-encryption key ("Kg") and send it back to the end-equipment manufacturer.

Although the session keys Ks may be created by either the component vendor or the end-equipment manufacturer, the session key Ks must always be encrypted by the component vendor. Also, all session keys Ks must be securely transferred between the component vendor and the end-equipment manufacturer using, for example, a software package compatible with the OpenPGP standard.

Three techniques can substantially reduce the probability that the HDCP device would ever need to be modified due to a compromised Kg key. These include 8-bit padding of 56-bit Ks key, triple-DES encryption of 64-bit padded Ks key, and Kg Key ID for renewability. In operation, the component vendor would first generate a 64-bit random number. The 64-bit encrypted version of the session key Ks is created by encrypting the 64-bit random number using the on-chip key-encryption key (Kg). The 56-bit unencrypted version of the session key Ks is created by extracting 56 bits from the 64-bit random number, e.g. 56 MSBs. The remaining 8 bits are never disclosed to the end-equipment manufacturer. Thus, if the encrypted and unencrypted session keys Ks are ever compromised, the cryptanalyst would still be missing an 8-bit random number required to perform a brute-force attack to determine the on-chip key-encryption key.

Triple-DES with three different and independent 56-bit keys to encrypt the shared content-encryption key (Ks) further protects the device keys. When using Triple-DES, the need for renewability of the encryption key (Kg) is virtually eliminated as no Key ID is required. When using Triple-DES, renewability of Kg would only be needed in cases of unauthorized or accidental disclosure by the component vendor. Immediately after the Ks-encrypted HDCP device key sets have been programmed into NVM, any other records of these encrypted device key sets should be securely destroyed. The self-encryption for key storage operation will essentially erase the last remaining record stored in NVM. This reduces the vulnerability of the shared content-encryption key (Ks) to a known-ciphertext attack. The entire initial NVM data structure should be overwritten by the self-encryption for key storage operation. This ensures that there is no remaining ciphertext such as an encrypted session key or an encrypted HDCP device key for cryptanalysis. For both the initial encryption using Ks and the final encryption using Ku, the 56-bit HDCP device keys should be padded with an 8-bit random number.

In addition, all keys being used, Ks, Kg and Ku should be randomly generated, the 4 weak keys, 12 semi-weak keys, or 48 possibly-weak keys associated with the DES cipher algorithm should be screened for, any internal register storing unencrypted keys of any kind should not be externally accessible, unencrypted and encrypted session key (Ks) pairs should be securely transferred between the component vendor and the end-equipment manufacturer using, for example, a software package compatible with the OpenPGP standard. The HDCP device key sets should always be encrypted from the time DCP sends the device key sets to the end-equipment manufacturer until the HDCP device performs the final self-encryption for key storage operation. All discarded keys should be securely destroyed.

The following tables provide specific implementation details illustrating different techniques and configurations for protecting private HDCP device key sets. As discussed, an HDCP transmitter supporting both the upstream and downstream link protocols requires two HDCP device key sets.

Key Control Word Data Structure

Key Control Word

The 64-bit Key Control Word ("KCW") would occupy the first 64-bit memory location of the proposed multi-line NVM header. The KCW comprises a 16-bit Key Status value followed by a 48-bit Key ID.

HDCP Key Status Value

The 16 MSBs of the first 64-bit memory location in the NVM shall be used to specify the encryption status (i.e. unencrypted vs. encrypted) of the HDCP device key set.

For instance,

If KCW [63:48]=DEADh, then the HDCP device key set is unencrypted.

If KCW [63:48]=DEAFh, then the HDCP device key set was encrypted using Ks.

If KCW [63:48] FEEDh, then the HDCP device key set was encrypted using Ku.

Key Identification (Key ID) Value

The 24 LSBs of the first 64-bit memory location in the NVM shall be used to specify which on-chip Kg value was used to encrypt Ks. The key ID would refer to one specific 56-bit Kg key for "single" DES or a set of three different 56-bit Kg keys for Triple-DES. For Triple-DES, the 24-bit Key ID could be divided into three 8-bit sub-key values and used to independently select the three Kg keys to be used as follows.

Key Control Word Data Structure

TABLE II

Key Control Word Data Structure

| Addr | KCW [63:48] | KCW [47:24] | KCW [23:16] | KCW [15:8] | KCW [7:0] |
|---|---|---|---|---|---|
| 000h | HDCP Key Status | Reserved | Sub-Key ID #3 | Sub-Key ID #2 | Sub-Key ID #1 |

1. The 64-bit Key Control Word (KCW) is never encrypted.
2. The desired 56-bit Kg key could alternatively be selected by laser fuse, metal mask change, or even using a couple spare pins on the device.

Initial NVM Data StructureTriple-DES Encryption of Ks Using Kg

Single-DES Encryption of HDCP Device Key Set Using Ks

First Embodiment of the Present Invention

2. The 64-bit Key Control Word (KCW) is never encrypted.

3. $R_R$ is an 8-bit random number generated by the component vendor.

4. $R_{S1}$ through $R_{S40}$ are 8-bit random numbers generated by the end-equipment manufacturer.

5. KSV stands for Key Selection Vector. The HDCP KSV is not required to be kept confidential.

Initial NVM Data Structure

Triple-DES Encryption of Ks Using Kg

| Addr | 64-bit NVM Memory Content | Description |
|---|---|---|
| 00h | Key Control Word (KCW) | 16-bit HDCP Key Status and 48-bit Kg Key ID |
| 01h | $E_{Kg3}(D_{Kg2}(E_{Kg1}(K_s, R_R)))$ | Triple-DES encrypted Ks value using Kg DES key. |
| 02h | HDCP KSV | 40-bit HDCP KSV. The most significant 3 bytes of this 64-bit block are zeros. |
| 03h | $E_{Ks}$(HDCP key #1, $R_{S1}$) | Single-DES encrypted HDCP device key #1. |
| 04h ... 29h | $E_{Ks}$(HDCP key #n, $R_{Sn}$) | Single-DES encrypted HDCP device keys #2 through #39. |
| 2Ah | $E_{Ks}$(HDCP key #40, $R_{S40}$) | Single-DES encrypted HDCP device key #40. |
| 2Bh ... 3Fh | Reserved | Unused bytes of standard 4K EEPROM. |

1. The NVM header consists of the two 64-bit memory locations starting at address 00 h.

Triple-DES Encryption of HDCP Device Key Set Using Ks

Second Embodiment of the Present Invention

| Addr | 64-bit NVM Memory Content | Description |
|---|---|---|
| 00h | Key Control Word (KCW) | 16-bit HDCP Key Status and 48-bit Kg Key ID |
| 01h | $E_{Kg3}(D_{Kg2}(E_{Kg1}(K_{s1}, R_{R1})))$ | 1st Kg encrypted Ks value for Triple-DES cipher. |
| 02h | $E_{Kg3}(D_{Kg2}(E_{Kg1}(K_{s2}, R_{R2})))$ | 2nd Kg encrypted Ks value for Triple-DES cipher. |
| 03h | $E_{Kg3}(D_{Kg2}(E_{Kg1}(K_{s3}, R_{R3})))$ | 3rd Kg encrypted Ks value for Triple-DES cipher. |
| 04h | HDCP KSV | 40-bit HDCP KSV. The most significant 3 bytes of this 64-bit block are zeros. |
| 05h | $E_{Ks3}(D_{Ks2}(E_{Ks1}(\text{HDCP key \#1}, R_{S1})))$ | Triple-DES encrypted HDCP device key #1. |
| 06h ... 2Bh | $E_{Ks3}(D_{Ks2}(E_{Ks1}(\text{HDCP key \#n}, R_{Sn})))$ | Triple-DES encrypted HDCP device keys #2 through #39. |
| 2Ch | $E_{Ks3}(D_{Ks2}(E_{Ks1}(\text{HDCP key \#40}, R_{S40})))$ | Triple-DES encrypted device HDCP key #40. |
| 2Dh ... 3Fh | Reserved | Unused bytes of standard 4K EEPROM. |

1. The NVM header consists of the four 64-bit memory locations starting at address 00 h.
2. $R_R$ is an 8-bit random number generated by the component vendor.
3. $R_{S1}$ through $R_{S40}$ are 8-bit random numbers generated by the end-equipment manufacturer.

Initial NVM Data Structure

Single-DES Encryption of Ks Using Kg

Single-DES Encryption of HDCP Device Key Set Using Ks

Third Embodiment of the Present Invention

| Addr | 64-bit NVM Memory Content | Description |
|---|---|---|
| 00h | Key Control Word (KCW) | 16-bit HDCP Key Status and 48-bit Kg Key ID |
| 01h | $E_{Kg}(K_s, R_R)$ | Single-DES encrypted Ks value using Kg DES key. |
| 02h | HDCP KSV | 40-bit HDCP KSV. The most significant 3 bytes of this 64-bit block are zeros. |
| 03h | $E_{Ks}$(HDCP key #1, $R_{S1}$) | Single-DES encrypted HDCP device key #1. |
| 04h ... 29h | $E_{Ks}$(HDCP key #n, $R_{Sn}$) | Single-DES encrypted HDCP device keys #2 through #39. |
| 2Ah | $E_{Ks}$(HDCP key #40, $R_{S40}$) | Single-DES encrypted HDCP device key #40. |
| 2Bh ... 3Fh | Reserved | Unused bytes of standard 4K EEPROM. |

1. The NVM header consists of the two 64-bit memory locations starting at address 00 h.
2. The 64-bit Key Control Word (KCW) is never encrypted.
3. $R_R$ is an 8-bit random number generated by the component vendor.
4. $R_{S1}$ through $R_{S40}$ are 8-bit random numbers generated by the end-equipment manufacturer.
5. KSV stands for Key Selection Vector. The HDCP KSV is not required to be kept confidential.

Final NVM Data Structure (After Self-Encryption)

Single-DES Encryption of HDCP Device Key Set Using Ku

First Embodiment of the Present Invention

1. The NVM header consists of the two 64-bit memory locations starting at address 00 h.
2. The second 64-bit memory location is reserved to maintain commonality with the initial NVM data structure.
3. The 64-bit Key Control Word (KCW) is never encrypted.
4. $R_{S1}$ through $R_{S40}$ are 8-bit random numbers generated by the end-equipment manufacturer.
5. KSV stands for Key Selection Vector. The HDCP KSV is not required to be kept confidential.

Final NVM Data Structure (After Self-Encryption)

Triple-DES Encryption of HDCP Device Key Set Using Ku

| Addr | 64-bit NVM Memory Content | Description |
|---|---|---|
| 00h | Key Control Word (KCW) | 16-bit HDCP Key Status |
| 01h | Reserved | All 8 bytes of this 64-bit block are zeros. |
| 02h | HDCP KSV | 40-bit HDCP KSV. The most significant 3 bytes of this 64-bit block are zeros. |
| 03h | $E_{Ku}$(HDCP key #1, $R_{S1}$) | Single-DES encrypted HDCP device key #1. |
| 04h ... 29h | $E_{Ku}$(HDCP key #n, $R_{Sn}$) | Single-DES encrypted HDCP device keys #2 through #39. |
| 2Ah | $E_{Ku}$(HDCP key #40, $R_{S40}$) | Single-DES encrypted HDCP device key #40. |
| 2Bh ... 3Fh | Reserved | Unused bytes of standard 4K EEPROM. |

Second Embodiment of the Present Invention

| Addr | 64-bit NVM Memory Content | Description |
|---|---|---|
| 00h | Key Control Word (KCW) | 16-bit HDCP Key Status |
| 01h | Reserved | All 8 bytes of this 64-bit block are zeros. |
| 02h | HDCP KSV | 40-bit HDCP KSV. The most significant 3 bytes of this 64-bit block are zeros. |
| 03h | $E_{Kus3}(D_{Ku2}(E_{Ku1}(\text{HDCP key #1}, R_{S1})))$ | Triple-DES encrypted HDCP device key #1. |
| 04h ... 29h | $E_{Ku3}(D_{Ku2}(E_{Ku1}(\text{HDCP key #n}, R_{Sn})))$ | Triple-DES encrypted HDCP device keys #2 through #39. |
| 2Ah | $E_{Ku3}(D_{Ku2}(E_{Ku1}(\text{HDCP key #40}, R_{S40})))$ | Triple-DES encrypted HDCP device key #40. |
| 2Bh ... 3Fh | Reserved | Unused bytes of standard 4K EEPROM. |

1. The NVM header consists of the four 64-bit memory locations starting at address 00 h.
2. The second 64-bit memory location is reserved to maintain commonality with the initial NVM data structure.
3. The 64-bit Key Control Word (KCW) is never encrypted.
4. $R_{S1}$ through $R_{S40}$ are 8-bit random numbers generated by the end-equipment manufacturer.
5. KSV stands for Key Selection Vector. The HDCP KSV is not required to be kept confidential.

Alternative 64-Bit DES Block Format

In order to achieve the highest level of security provided by the DES cipher algorithm, the entire 64-bit block size should always be utilized.

One method to achieve this is to pad each 56-bit device key with an 8-bit random number. An alternative method for maintaining a 64-bit block size would be to pack the 56-bit device keys as follows.

|  | Byte 7 | Byte 6 | Byte 5 | Byte 4 | Byte 3 | Byte 2 | Byte 1 | Byte 0 |
|---|---|---|---|---|---|---|---|---|
| 64-bit Block 0 | Key[0,6] | Key[0,5] | Key[0,4] | Key[0,3] | Key[0,2] | Key[0,1] | Key[0,0] | Key[1,6] |
| 64-bit Block 1 | Key[1,5] | Key[1,4] | Key[1,3] | Key[1,2] | Key[1,1] | Key[1,0] | Key[2,6] | Key[2,5] |
| 64-bit Block 2 | Key[2,4] | Key[2,3] | Key[2,2] | Key[2,1] | Key[2,0] | Key[3,6] | Key[3,5] | Key[3,4] |
| 64-bit Block 3 | Key[3,3] | Key[3,2] | Key[3,1] | Key[3,0] | Key[4,6] | Key[4,5] | Key[4,4] | Key[4,3] |
| 64-bit Block 4 | Key[4,2] | Key[4,1] | Key[4,0] | Key[5,6] | Key[5,5] | Key[5,4] | Key[5,3] | Key[5,2] |
| 64-bit Block 5 | Key[5,1] | Key[5,0] | Key[6,6] | Key[6,5] | Key[6,4] | Key[6,3] | Key[6,2] | Key[6,1] |
| 64-bit Block 6 | Key[6,0] | Key[7,6] | Key[7,5] | Key[7,4] | Key[7,3] | Key[7,2] | Key[7,1] | Key[7,0] |
| 64-bit Block 7 ... 64-bit Block 34 | | | | | | | | |

The HDCP device would then need to unpack the 56-bit device keys after decryption. Since this approach minimizes storage requirements, this would be the best approach when storing the HDCP device key set on-chip (i.e. reduces memory size by 12.5%). This is similar to the technique called Pack-24 used to pack 24-bit RGB data into 32-bit graphics memory.

Alternative HDCP Key Status Value

The HDCP device key sets should never be encrypted using a content-encryption key (Ks or Ku value) equal to any of the 4 weak keys, 12 semi-weak keys, or 48 possibly-weak keys associated with the DES cipher algorithm. Thus, any of these 64 weak, semi-weak or possibly-weak keys could be reserved for specifying the encryption status (i.e. unencrypted vs. encrypted) of the HDCP device key sets instead of using the 16 MSBs of the 64-bit key control word.

For example (using the 4 weak keys only),

A 56-bit session key (Ks) value of "00000000 00000000"h could mean that the HDCP device key set is unencrypted (i.e. raw).

A 56-bit session key (Ks) value of "FFFFFFFF FFFFFFFF"h could mean that the HDCP device key set has already been self-encrypted.

Using this alternative approach, the HDCP device would first decrypt the NVM header using the global key-encryption key (Kg) to determine the session key (Ks). Next, the HDCP device would evaluate the recovered session key (Ks) to see if it corresponds to one of the two (or more) reserved values. If not, it would decrypt the HDCP device key set using the recovered session key (Ks) and immediately re-encrypt using the unique content-encryption key (Ku). The reserved session key (Ks) value of "FFFFFFFF FFFFFFFF"h would be re-encrypted using the global key-encryption key (Kg) and then used as the final NVM header. The session key (Ks) within the NVM header must always be encrypted even when the session key (Ks) value equals one of the reserved control words.

While this invention has been described with reference to a generic and HDCP exemplary embodiment, this description is not intended to be construed in a limiting sense. For example, the present invention can be implemented for other specifications and protocols. Various modifications and combinations of the exemplary embodiments, as well as other embodiments of the invention, will be apparent to persons skilled in the art upon reference to the description. It is therefore intended that the appended claims encompass any such modifications or embodiments.

This invention could be used with any content protection standard having secret device keys or other secret values that need to be protected (e.g. DTCP rather than HDCP).

This invention could be implemented using any symmetric-key cipher algorithm (e.g. AES rather than DES).

The proposed key protection scheme would be applicable for both internally or externally stored HDCP device key sets.
  a. For externally stored HDCP device key sets, end-equipment manufacturers need a key protection scheme to protect the HDCP device key sets during their manufacturing process.
  b. For internally stored HDCP device key sets, component vendors need a key protection scheme to protect the HDCP device key sets during their manufacturing process.

The invention claimed is:

1. A method of protecting an HDCP key set containing 40 56-bit device keys between a message sender and a message recipient having a private encryption key, the method comprising the steps of:
  randomly generating a session key; and
  encrypting the session key using a first symmetric-key cipher algorithm with the private encryption key;
  sending the unencrypted session key and the encrypted session key to the message sender;
  encrypting the HDCP key set using a second symmetric-key cipher algorithm with the unencrypted session key, wherein each device key within the HDCP device key set is a 56-bit value and is padded with an 8-bit random number prior to DES or Triple DES encryption in order to utilize the entire 64-bit block size of DES or Triple-DES;
  sending the encrypted private message data and the encrypted session key to the message recipient;
  decrypting with a processing system the encrypted session key using the first symmetric-key cipher algorithm with the private encryption key by the message recipient; and
  decrypting with the processing system the HDCP key set using the second symmetric-key cipher algorithm with the decrypted session key.

2. The method as specified in claim 1 wherein the first symmetric-key cipher algorithm used to encrypt the session key comprises DES or triple-DES cipher algorithm.

3. The method as specified in claim 2 wherein each session key is a 56-bit value and is padded with an 8-bit random number prior to DES or Triple DES encryption in order to utilize an entire 64-bit block size of DES or Triple-DES.

4. The method as specified in claim 1 wherein the second symmetric-key cipher algorithm comprises DES, triple-DES or AES cipher algorithm.

5. The method as specified in claim 1 wherein the first symmetric-key algorithm is implemented in a content protection device for the purpose of decrypting the session key.

6. The method as specified in claim 1 wherein the encrypted session key and the secret cryptographic values are stored in a non-volatile memory device.

7. The method as specified in claim 1 wherein the encryption status value is stored in a non-volatile memory device.

8. The method as specified in claims 6 wherein the non-volatile memory device comprises an EEPROM.

9. The method as specified in claims 7 wherein the non-volatile memory device comprises an EEPROM.

10. The method as specified in claim 1 wherein the message recipient comprises a component vendor when the session key is being randomly generated, encrypted and securely sent to the message sender.

11. A method of protecting an HDCP key set containing 40 56-bit device keys between a message sender and a message recipient having a private encryption key, the method comprising the steps of:
  randomly generating a session key; and
  encrypting the session key using a first symmetric-key cipher algorithm with the private encryption key;
  sending the unencrypted session key and the encrypted session key to the message sender; and
  encrypting the HDCP key set using a second symmetric-key cipher algorithm with the unencrypted session key, wherein the 40 56-bit device keys within the HDCP device key set are packed into 35 64-bit blocks prior to DES or Triple DES encryption in order to utilize the entire 64-bit block size of DES or Triple-DES;
  sending the encrypted HDCP key set and the encrypted session key to the message recipient;
  decrypting with a processing system the encrypted session key using the first symmetric-key cipher algorithm with the private encryption key by the message recipient; and
  decrypting with the processing system the private message data using the second symmetric-key cipher algorithm with the decrypted session key.

12. The method as specified in claim 11 wherein the first symmetric-key cipher algorithm used to encrypt the session key comprises DES or triple-DES cipher algorithm.

13. The method as specified in claim 12 wherein each session key is a 56-bit value and is padded with an 8-bit random number prior to DES or Triple DES encryption in order to utilize an entire 64-bit block size of DES or Triple-DES.

14. The method as specified in claim 11 wherein the second symmetric-key cipher algorithm comprises DES, triple-DES or AES cipher algorithm.

15. The method as specified in claim 11 wherein the first symmetric-key algorithm is implemented in a content protection device for the purpose of decrypting the session key.

16. method as specified in claim 11 wherein the encrypted session key and the secret cryptographic values are stored in a non-volatile memory device.

17. The method as specified in claim 11 wherein the encryption status value is stored in a non-volatile memory device.

18. The method as specified in claims 16 wherein the non-volatile memory device comprises an EEPROM.

19. The method as specified in claims 17 wherein the non-volatile memory device comprises an EEPROM.

20. The method as specified in claim 11 wherein the message recipient comprises a component vendor when the session key is being randomly generated, encrypted and securely sent to the message sender.

* * * * *

UNITED STATES PATENT AND TRADEMARK OFFICE
CERTIFICATE OF CORRECTION

PATENT NO. : 7,668,313 B2
APPLICATION NO. : 11/263455
DATED : February 23, 2010
INVENTOR(S) : James Edward Nave It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-eighth Day of December, 2010

David J. Kappos
*Director of the United States Patent and Trademark Office*